(12) United States Patent
Clyde et al.

(10) Patent No.: US 12,138,601 B1
(45) Date of Patent: Nov. 12, 2024

(54) WINE CONTAINER AERATOR AND CLOSURE ASSEMBLY

(71) Applicants: Christopher Joseph Clyde, San Antonio, TX (US); Shi Li Jun, YongKang (CN); Wang Xiao Bo, YongKang (CN)

(72) Inventors: Christopher Joseph Clyde, San Antonio, TX (US); Shi Li Jun, YongKang (CN); Wang Xiao Bo, YongKang (CN)

(*) Notice: Subject to any disclaimer, the term of this patent is extended or adjusted under 35 U.S.C. 154(b) by 412 days.

(21) Appl. No.: 17/702,720

(22) Filed: Mar. 23, 2022

Related U.S. Application Data

(60) Provisional application No. 63/165,337, filed on Mar. 24, 2021.

(51) Int. Cl.

| | |
|---|---|
| *B01F 23/236* | (2022.01) |
| *B01F 23/237* | (2022.01) |
| *B01F 25/00* | (2022.01) |
| *B01F 35/00* | (2022.01) |
| *B65D 47/12* | (2006.01) |
| *B65D 47/32* | (2006.01) |
| *B65D 81/38* | (2006.01) |
| *F16K 11/074* | (2006.01) |

(Continued)

(52) U.S. Cl.
CPC .... *B01F 23/236* (2022.01); *B01F 23/237611* (2022.01); *B01F 25/1051* (2022.01); *B01F 35/189* (2022.01); *B65D 47/12* (2013.01); *B65D 47/32* (2013.01); *B65D 81/3837* (2013.01); *F16K 11/074* (2013.01); *F16K 31/5286* (2013.01); *B01F 2101/17* (2022.01); *B01F 2215/0422* (2013.01)

(58) Field of Classification Search
CPC ............ B01F 23/236; B01F 23/237611; B01F 25/1051; B01F 35/189; B01F 2101/17; B01F 2215/0422; B65D 47/12; B65D 47/32; B65D 81/3837; F16K 11/074; F16K 31/5286
See application file for complete search history.

(56) References Cited

U.S. PATENT DOCUMENTS 9,016,930 B2 * 4/2015 Cayley, Sr. ............. B01F 31/22
366/218

FOREIGN PATENT DOCUMENTS

WO    WO 2022/175431 A1 *  8/2022

OTHER PUBLICATIONS

Partial English Translation of WO 2022175431 A1 (Year: 2022).*

* cited by examiner

*Primary Examiner* — Charles S Bushey
(74) *Attorney, Agent, or Firm* — Rick B. Yeager

(57) ABSTRACT

A closure mechanism for a wine storage container having two fluid channels provides a compressive structure to apply a compressive force to a delayed valve actuation mechanism having an actuation plate, a support plate, and a valve plate. The actuation plate may be partially rotated before beginning to open or close the fluid openings. The first fluid channel permits wine to flow from the lower portion of the storage container, through an aerator, and through a valve cap assembly. The second fluid channel permits air to flow into the valve cap assembly to the aerator, and to vent the container. The valve cap assembly includes a decorative cap with a liquid outlet port positioned 180 degrees from a vent inlet port. In a fully open orientation, the liquid outlet port is positioned over the first fluid channel, and the vent inlet port is positioned over the second fluid channel.

5 Claims, 16 Drawing Sheets

(51) Int. Cl.
*F16K 31/528* (2006.01)
*B01F 101/17* (2022.01)

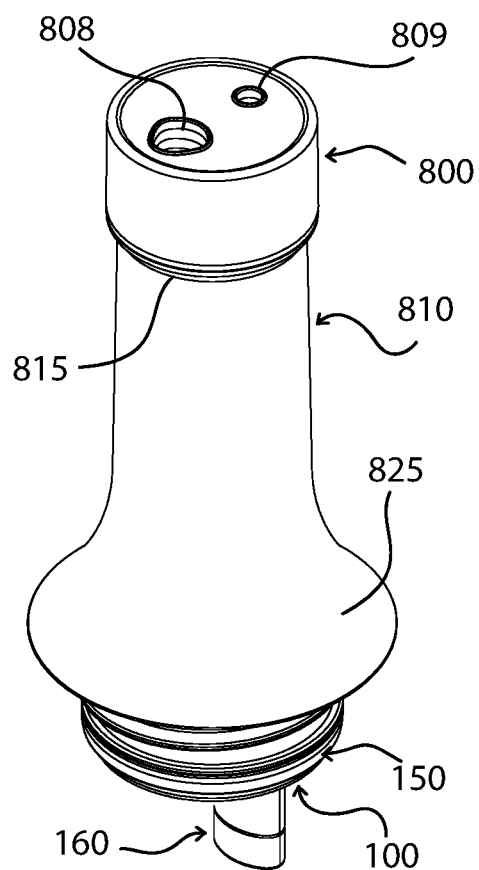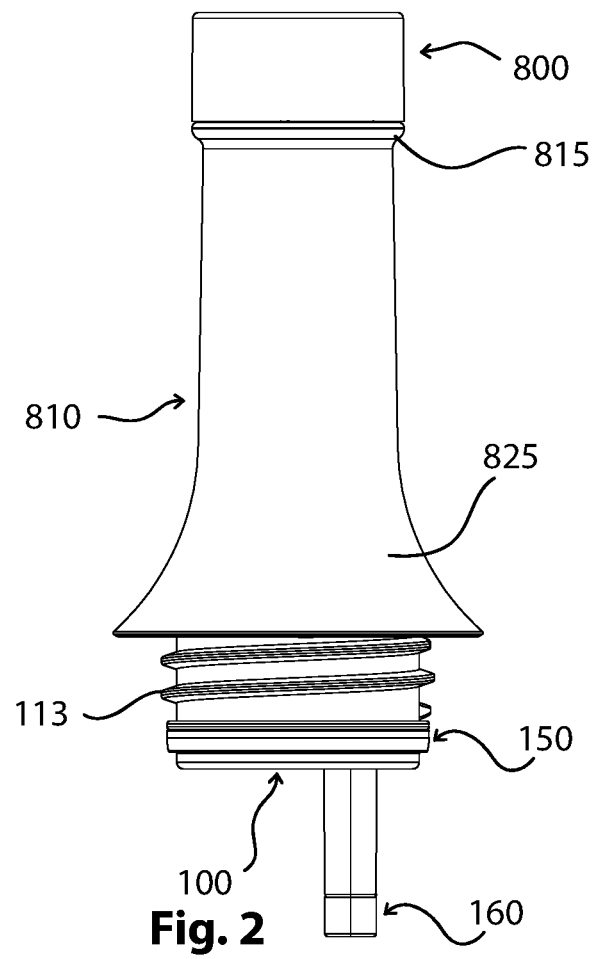
Fig. 1
Fig. 2

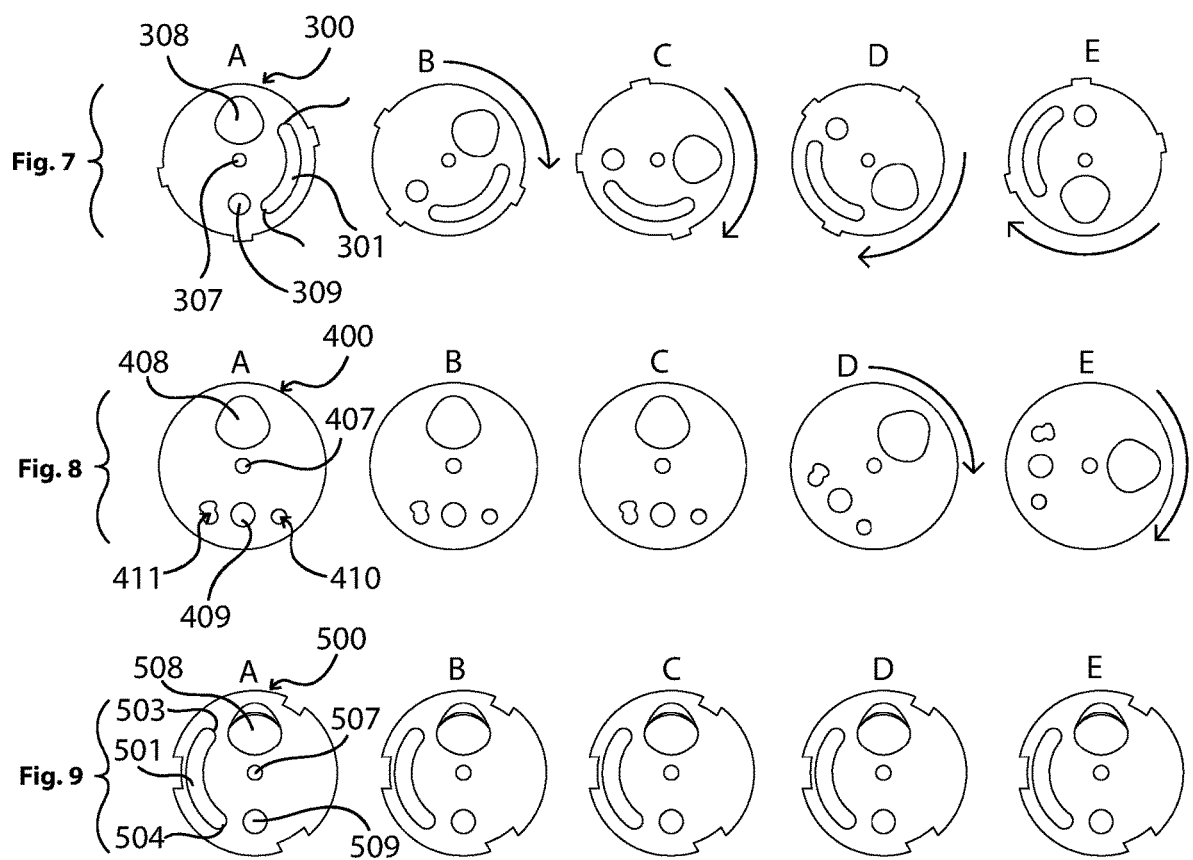

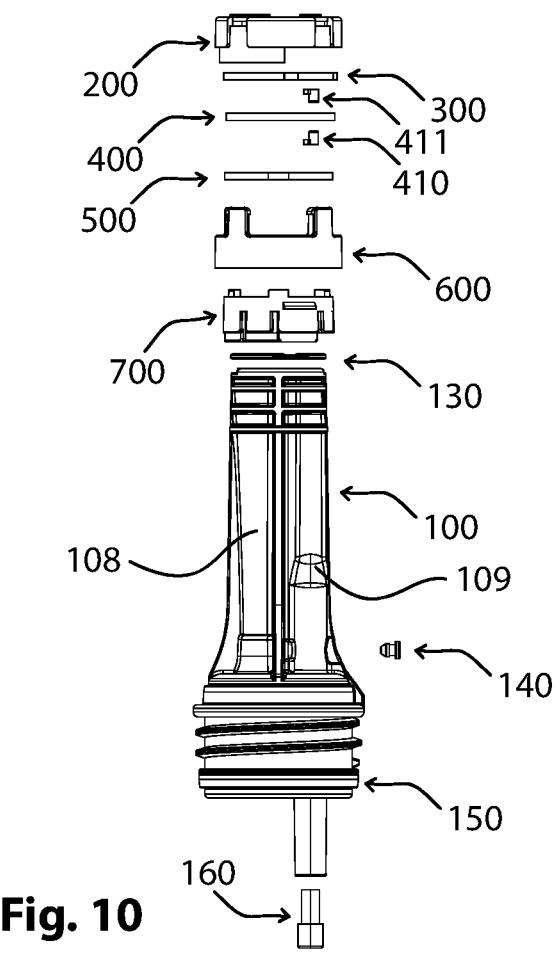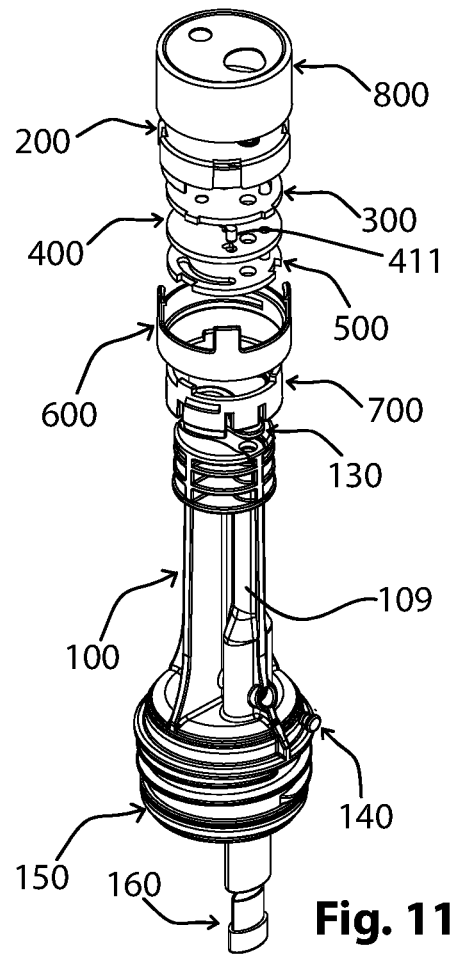

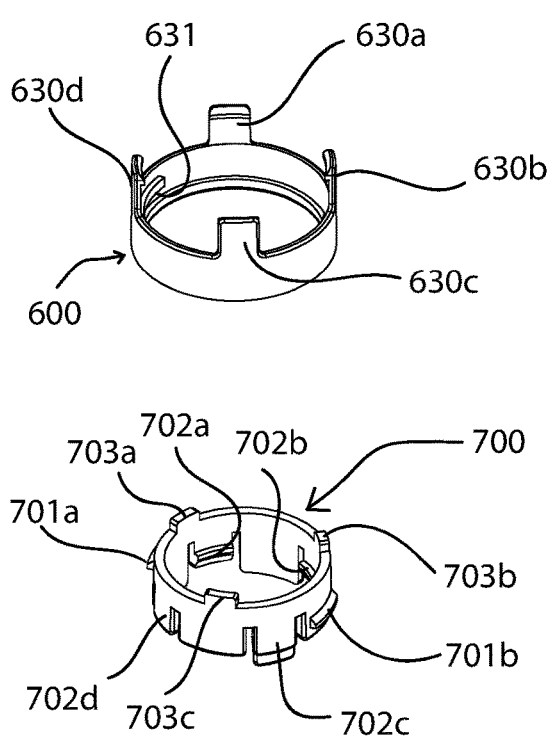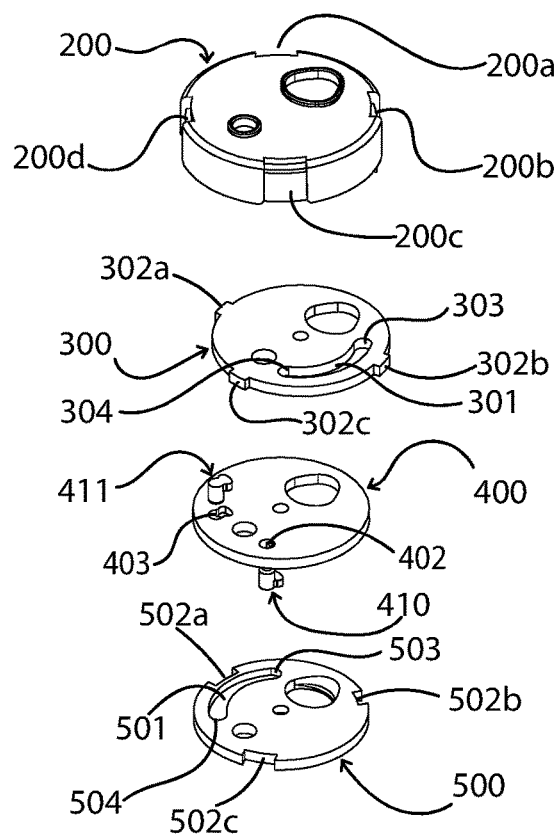
Fig. 14
Fig. 15

WINE CONTAINER AERATOR AND CLOSURE ASSEMBLY

This US Non-Provisional patent application is related to U.S. Provisional Patent Application No. 63/165,337 filed by applicants on Mar. 24, 2021, and claims priority from that application.

BACKGROUND

Field of the Invention

A wine container aerator with a closure assembly for sealing and resealing liquid pour and vent ports where the rotation of a sealing element is less than the rotation of an actuation element.

Prior Art

Current closures for personal or consumer bottles offer two common methods to open and reseal the liquid contents contained in the bottle. One common type is a simple twist cap found on carbonated beverages. This cap is made with threading on the inside of the cap wall and operated by twisting or rotating the cap successively until the cap is removed. This style of cap separates from the bottle as part of its operations and, consequently, can be inconvenient to manage or risks being lost or misplaced.

Another common type of closure is a push-pull cap found on sports bottles. This style of cap is operated by pulling upward on a movable center closure opposite a fixed mating piece that then allows the liquid to flow from the bottle. This cap requires the bottle to be squeezed in order to force fluid out and has a high profile.

Both styles are designed for bottles with single opening and do not address situations where two openings improve the pouring the liquid from the bottle. There are benefits to having two openings, most notable is the prevention of glugging (the irregular flow or splashing caused by air being unable to enter the bottle as the liquid exits the opening). Another benefit is where a second opening is required to allow interaction with the liquid, such as by venturi aeration, whereby air is introduced into the liquid as it pours.

Some bottled beverages, like wine, can benefit greatly from a closure that provides simple operation, the ability to reseal, eliminate the risk of cap loss due to separation from the bottle, and offer enhanced benefits like anti-glug or venturi aeration.

As such, it would be desirable to provide a closure that incorporates such features like simple twist motion for ease of use, low profile height, eliminate the risk of cap loss, and offer the ability to open and reseal two openings, thereby providing benefits like anti-glugging and venturi aeration.

SUMMARY

A closure mechanism for a container having two fluid channels provides a compressive structure to apply a compressive force to a delayed valve actuation mechanism where an actuation plate may be partially rotated before beginning to open or close the fluid openings. In one example, the delayed valve actuation mechanism has an actuation plate, a support plate, and a valve plate.

In one embodiment, a closure mechanism is provided on the neck of a liquid storage container.

In one example, the storage container is an insulated wine storage container with a wide mouth and a removable neck assembly which tapers to a narrow non-removable cap assembly. Two fluid channels are provided through the neck assembly. An aerator is provided in the neck assembly. A first fluid channel permits wine to flow from the lower portion of the storage container, through the aerator, and through a valve cap assembly. A second fluid channel permits air to flow into the valve cap assembly to the aerator, and to vent the container to prevent glugging as liquid is poured through the first channel. The valve cap assembly includes a decorative cap with a liquid outlet port positioned 180 degrees from a vent inlet port. In a fully open orientation, the liquid outlet port is positioned over the first fluid channel, and the vent inlet orientation, the liquid outlet port is positioned over the first fluid channel, and the vent inlet port is positioned over the second fluid channel.

From the "open" orientation, the decorative cap may be turned clockwise 180 degrees to a "closed" orientation, so that the positions of the liquid outlet port and the vent inlet port are reversed, but a concealed valve element inside the valve cap assembly is rotated only 90 degrees in order to seal both the first and second fluid channels. From the "closed" orientation, the decorative cap may be turned counterclockwise 180 degrees back to the "open" orientation, but the concealed valve element is rotated back only 90 degrees in order to open both the first and second fluid channels.

In this example, the valving action is accomplished with a valve assembly which is contained within a compressive structure. The valve assembly includes three major elements—an actuation plate, a support plate, and a valve plate. Each of these elements has a different travel. The actuation plate can travel from 0 degrees to 180 degrees clockwise, and back from 180 degrees to 0 degrees as the decorative cap is turned over that range. The support plate is fixed relative to the compressive structure.

A slot and post mechanism is used to delay the valve plate closure movement. As the actuator plate is rotated 90 degrees clockwise from an open position, a guide post on the valve plate moves within an arced slot on the actuator plate, and there is no movement of the valve plate. As the actuator plate is rotated clockwise from 90 degrees to 180 degrees, the guide post engages one end of the arced slot so the valve plate is rotated from 0 degrees to 90 degrees.

As the actuator plate is rotated counterclockwise from 180 degrees to 90 degrees, the guide post within an arced slot, and there is no movement of the valve plate. As the actuator plate is rotated counterclockwise from 90 degrees to 0 degrees, the guide post engages the other end of the arced slot so the valve plate is also rotated from 90 degrees to 0 degrees.

A stop mechanism prevents counterclockwise rotation beyond the open orientation and prevents or clockwise rotation beyond the closed orientation.

The compressive structure exerts a compressive force on the sealing surfaces of the actuation plate, the support plate, and the valve plate.

In these examples, a closure action occurs in first phase where an actuation element is partially rotated with no sealing action initiated, followed by continued rotation of the actuation plate that rotates the valve plate to a closed orientation.

BRIEF DESCRIPTION OF THE DRAWINGS

FIG. 1 is a top perspective view of the neck portion of a wine container embodiment.

FIG. 2 is a side view of the neck portion of a wine container embodiment of FIG. 1.

FIG. 7 shows the orientation of the actuation plate of FIG. 4 in various orientations.

FIG. 8 shows the orientation of the valve plate of FIG. 4 in various orientations.

FIG. 9 shows the orientation of the support plate of FIG. 4 in various orientations.

FIG. 10 is an exploded side view of top portion of the wine container embodiment of FIG. 4.

FIG. 11 is an exploded top perspective view of top portion of the wine container embodiment of FIG. 4.

FIG. 14 is an exploded top perspective view of the cap holder, and locking element of FIG. 4.

FIG. 15 is an exploded top perspective view of the decorative cap, compressive cap, actuation plate, valve plate, and support plate of FIG. 4.

DETAILED DESCRIPTION

Definitions

In this specification, the terms "clockwise" and "counterclockwise" are used to explain relative orientations and operation of valve elements where "0 degrees" represents an open configuration, and clockwise rotation is used to "close" the valve elements. In other examples, the open orientation may be designated at any point, and counterclockwise rotations may be used to close valve elements.

Element List

The following element list is provided for convenience in reviewing the figures.

Figures 3A, 3B:
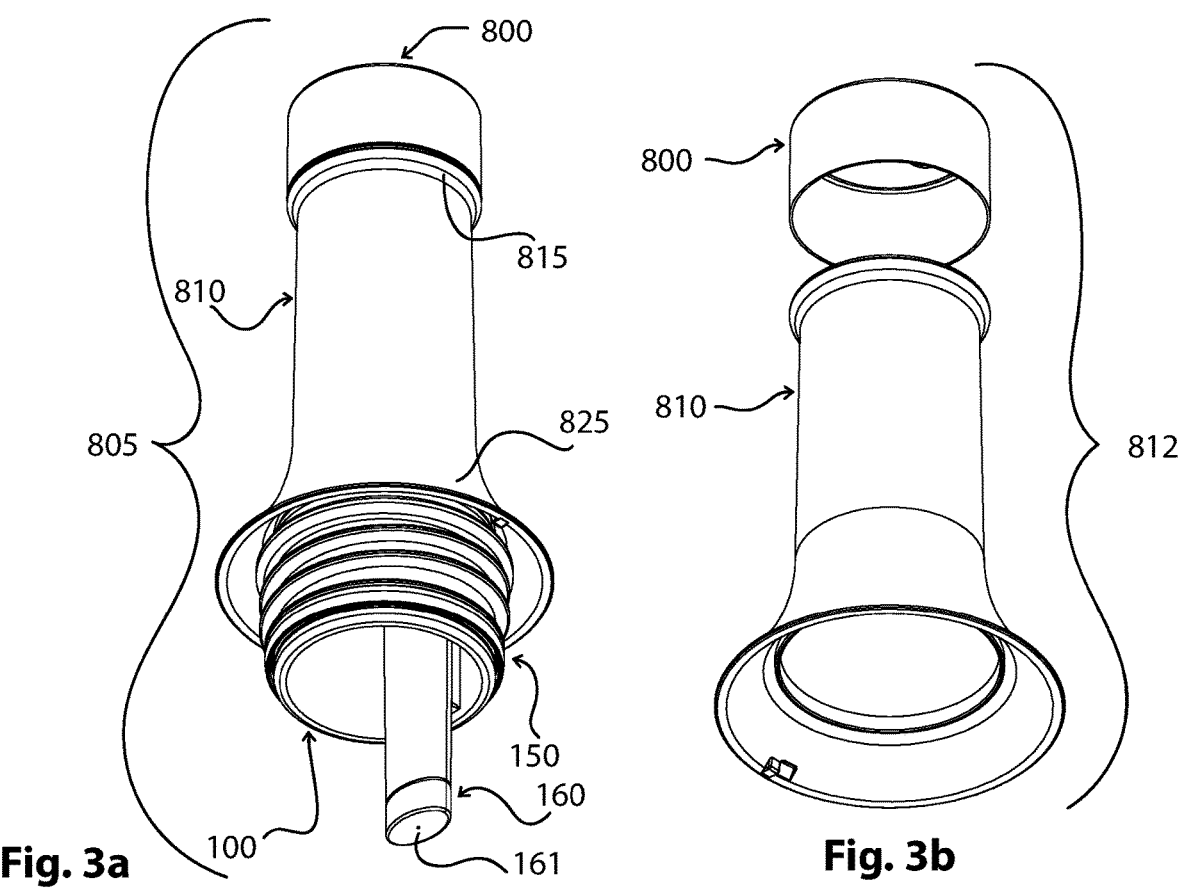
FIG. 3A is a bottom perspective view of the neck portion of a wine container embodiment of FIG. 1.
FIG. 3B is an exploded bottom perspective view of the decorative neck housing and decorative cap.

Storage container 850
landmark 830
wide mouth 855
removable neck assembly 805
decorative neck assembly 812
decorative neck housing 810
raised feature 815
flared transition 825
decorative cap 800
valve cap assembly 870-
aerator 100
—
aerator 100
first fluid channel 108
second fluid channel 109
ribs 111
venturi service opening 112
threaded base 113
recessed vent tube 115
pour opening 118
vent opening 119
concentric ribs 120
silicone O-ring channel 140
silicone O-ring 150
backflow preventer 160
vent hole 161
silicone seal 130
valve cap assembly 870
decorative cap 800
liquid outlet port 808
vent inlet port 809
delayed valve actuation mechanism 880
actuation plate 300
arced slot 301
closing end 303
opening end 304
center hole 307
liquid opening 308
vent opening 309
tabs 302a, 302b, and 302c.
valve plate 400
center hole 407
liquid opening 408
vent opening 409
actuator guide pin 410
actuator guide pin hole 402
stop guide pin 411
stop guide pin hole 402
support plate 500
arced slot 501
closing end 503
opening end 504
center hole 507
liquid opening 508
vent opening 509
notches 502a, 502b, 503b
compressive structure 890
compressive cap 200
notches 200a, 200b, 200c
cap holder 600
tabs 630a, 630b, 630c, 630d
channel 631
locking element 700
tabs 701a, 701b
tabs 702a, 702b, 702c, 702d Example—Removable Wine Container Neck Assembly FIGS. 1-3 are a top perspective, side, and bottom perspective views of a removable neck assembly 805 for a wine container 850 with an integral aerator 100. The removable neck assembly 805 includes a decorative neck assembly 812 comprising a decorative cap 800 and decorative neck housing 810 with a raised feature 815 for providing strain-relief of the decorative cap and flared transition portion 825 to which houses the aerator 100 and provides aesthetic transition of the container radius. In this example, the removable neck assembly 805 is secured to the container 850 with threaded base 113. A silicone "O" ring 150 is compressed by the threads. The aerator 100 includes a backflow preventer 160 with vent hole 161. The vent hole 161 has a hole diameter such that the opening can be optimized to allow air flow to vent the container, prevent liquid intrusion into the venturi, and provide auditory feedback of venturi operation. In one example, the preferred range is from 1.3-1.4 mm, and a diameter of 1.35 mm appears to be optimal.

The decorative cap 800 is shown in an open position with a liquid pour outlet 808 in communication with a liquid pour channel 108, and the vent inlet 809 in communication with a vent channel 109. The liquid pour channel 108 and the vent channel 109 extend through the aerator.

The user turns the decorative cap to actuate valve elements to simultaneously open or close the liquid pour channel 108 and the vent channel 109.

A raised lip 815 on the decorative neck 810 provides both anti-slip while holding decorative neck and anti-snag of lower edge of decorative cap 800.

Figure 4:
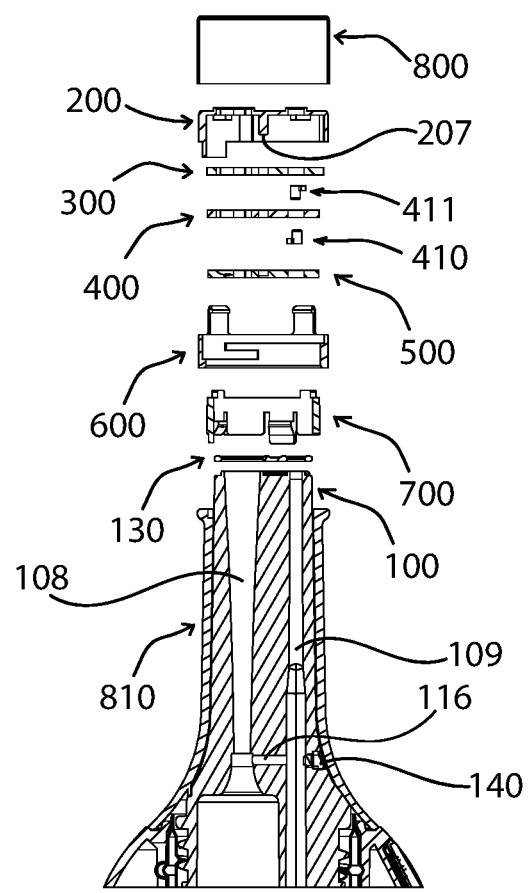
FIG. 4 is an exploded cross section view of an embodiment of a container neck with a valve cap assembly, a decorative cap, compressive cap, actuation plate, valve plate, support plate, cap holder, and locking element.

FIG. 4 is an exploded cross section view of an embodiment of a container neck 810 with an example closure and sealing mechanism comprising a decorative cap 800, compressive cap 200, actuation plate 300, valve plate 400, support plate 500, cap holder 600, and locking element 700. In this example, it is desirable for the aerator vent channel 109 and a liquid pour channel 108 be opened and closed with a single 180 degree twist of a decorative cap 800. Since the aerator vent channel and the liquid pour channel are positioned 180 degrees apart, the sealing mechanism movement must be different from the decorative cap movement. The compressive cap 200 has a downward extending center pin 207 which extends through center holes in the actuation plate 300, valve plate 400, and support plate 500.

Figure 5:
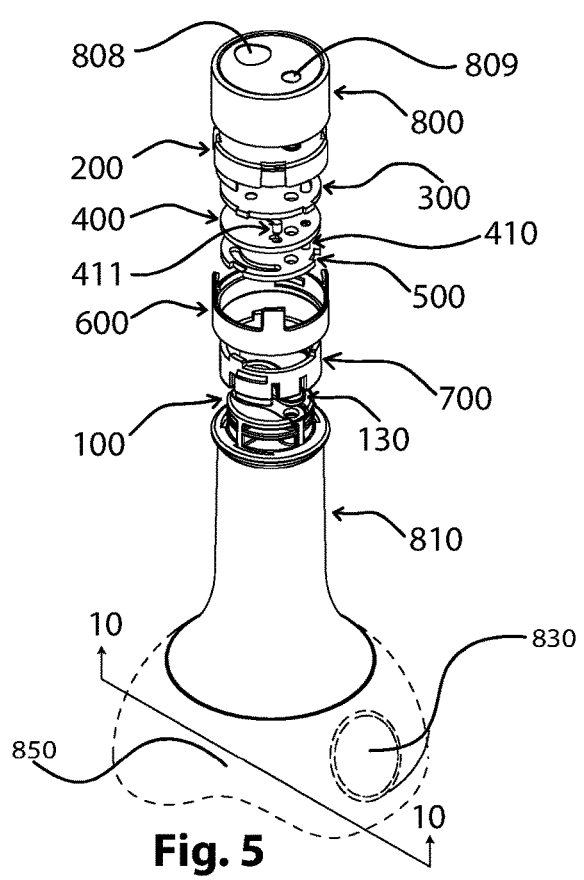
FIG. 5 is an exploded top perspective view of the top the neck portion of a wine container embodiment of FIG. 4 in an open position.
Figure 6:
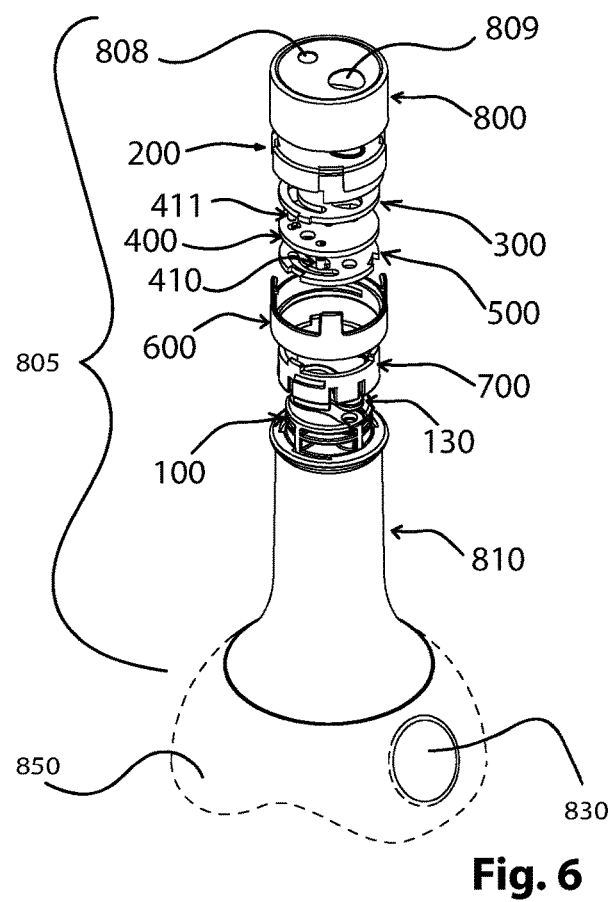
FIG. 6 is an exploded top perspective view of the top the neck portion of a wine container embodiment of FIG. 4 in a closed position.
Figure 12:
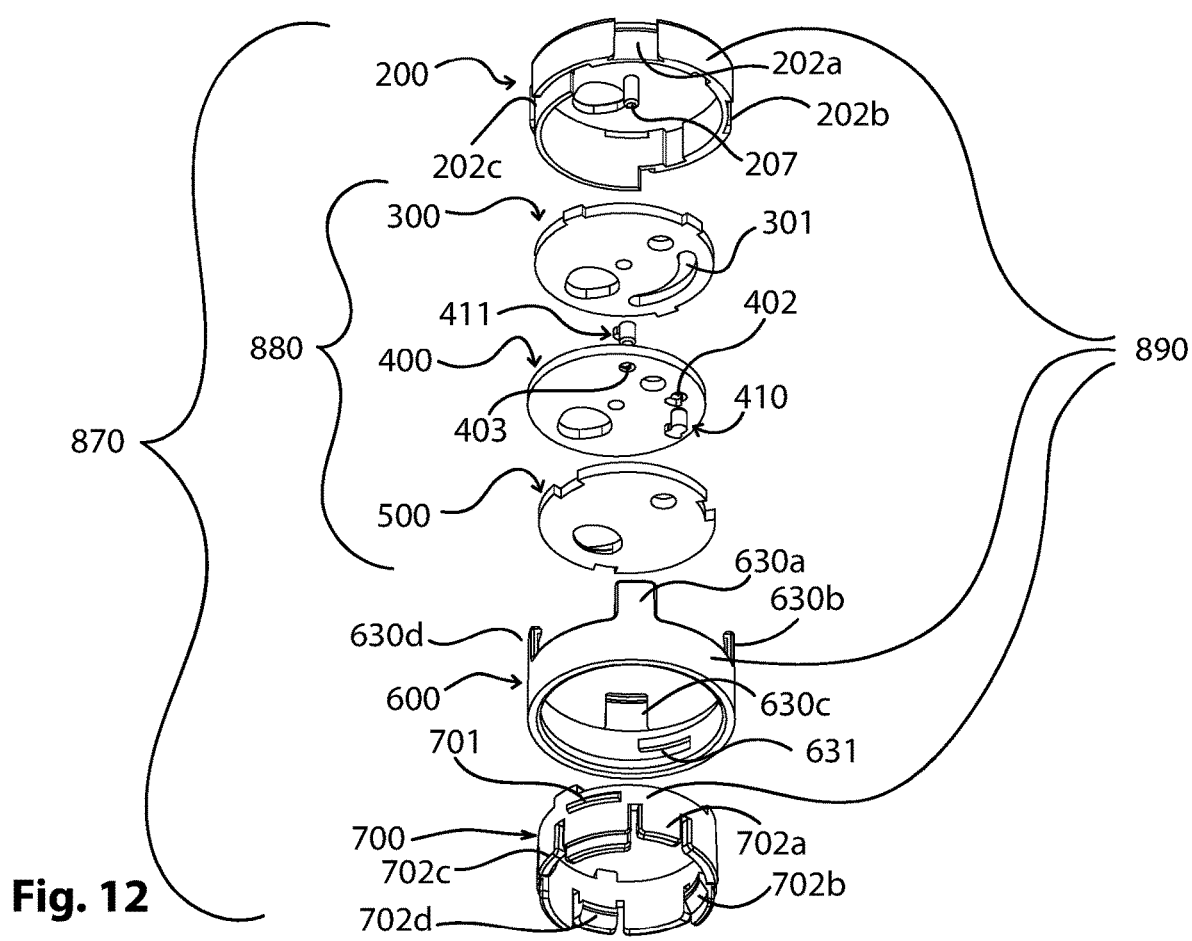
FIG. 12 is an exploded bottom perspective view of the compressive cap, actuation plate, valve plate, upper guide pin, lower guide pin, support plate, cap holder, and locking element of FIG. 4.
Figure 13:
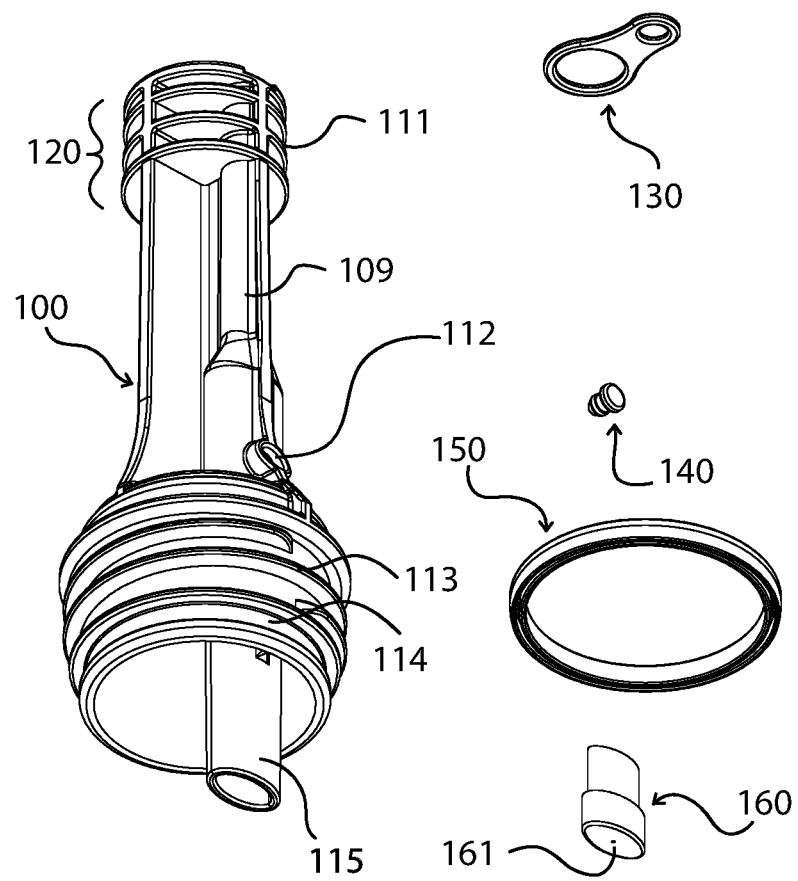
FIG. 13 is an exploded bottom perspective view of the aerator assembly of FIG. 4.
Figure 16:
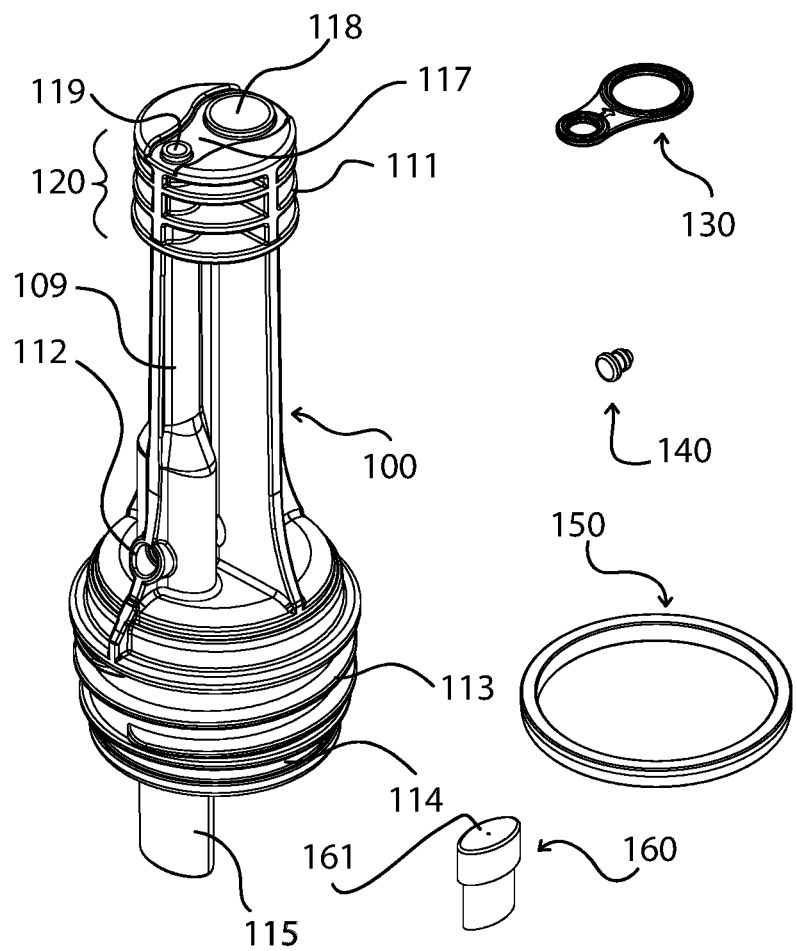
FIG. 16 is an exploded top perspective view of the aerator assembly of FIG. 4.
Figure 17:
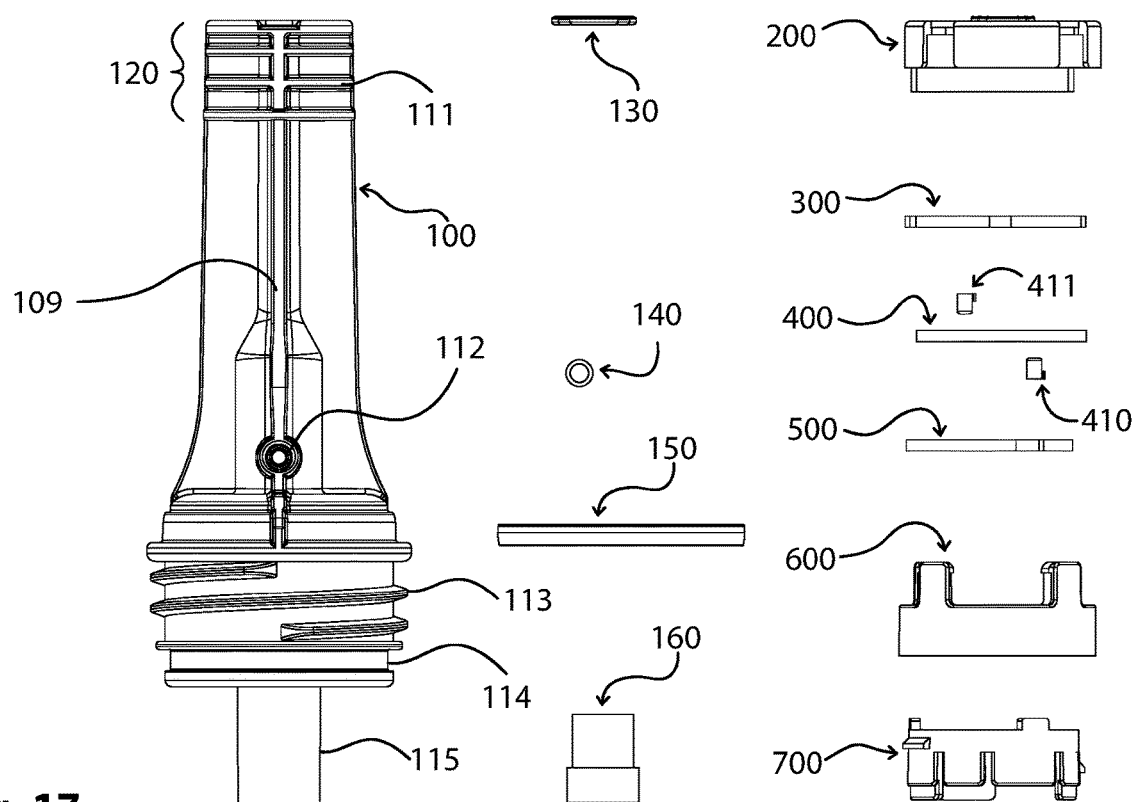
FIG. 17 is an exploded front view cross section view of the components of FIG. 4.
Figure 18:
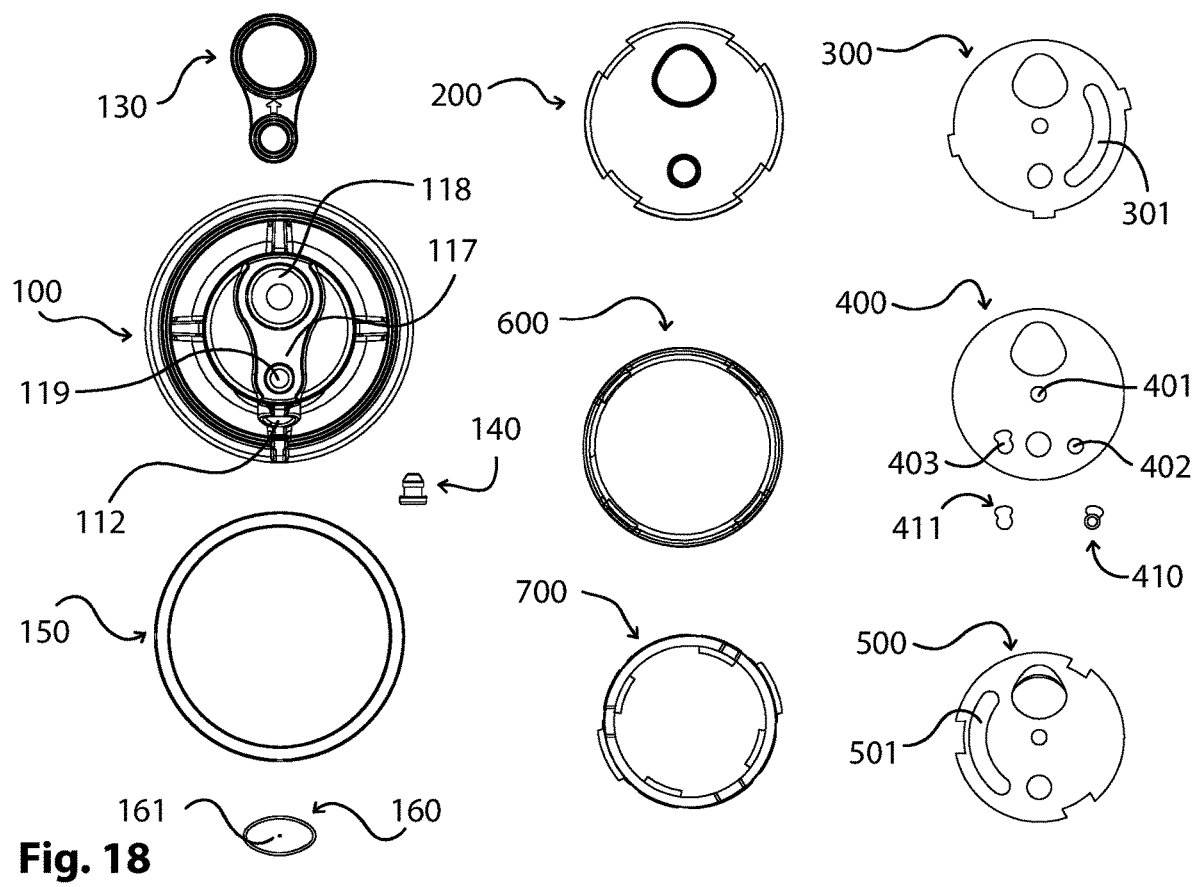
FIG. 18 is an exploded top view of the components of FIG. 4.
Figure 19:
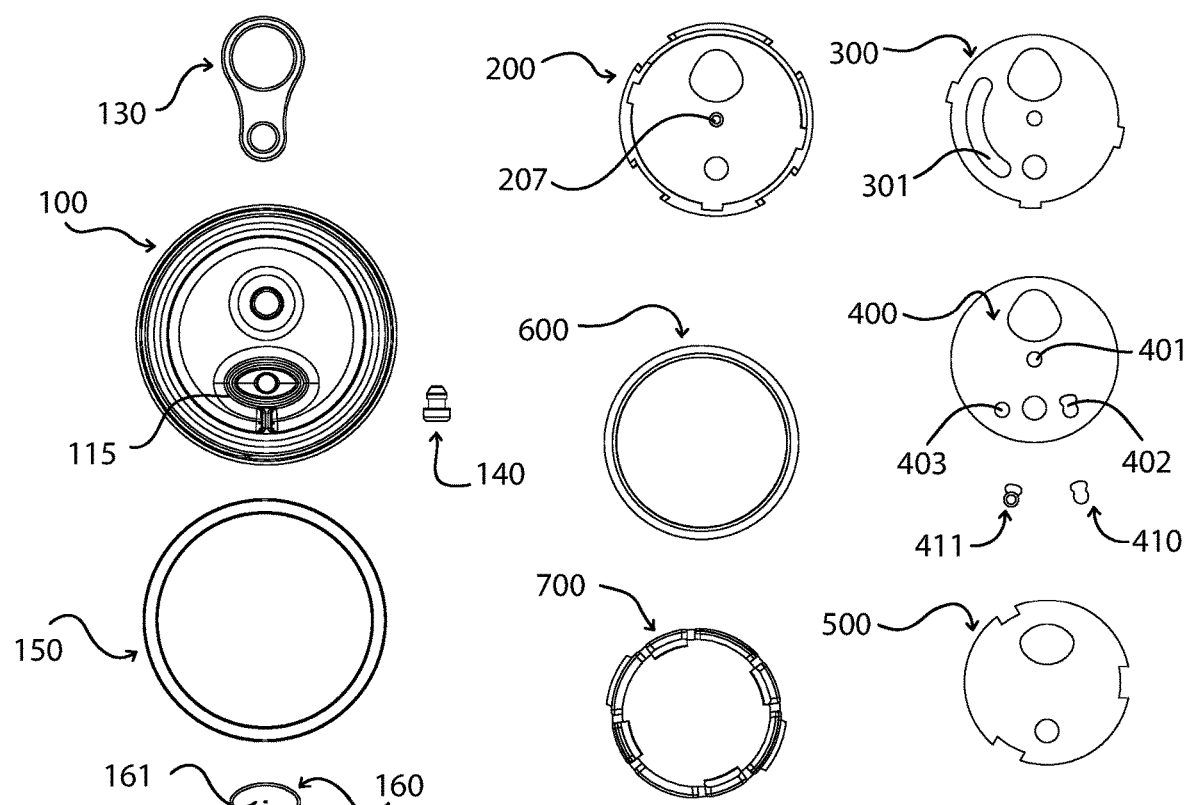
FIG. 19 is an exploded bottom view of the components of FIG. 4.
Figure 20:
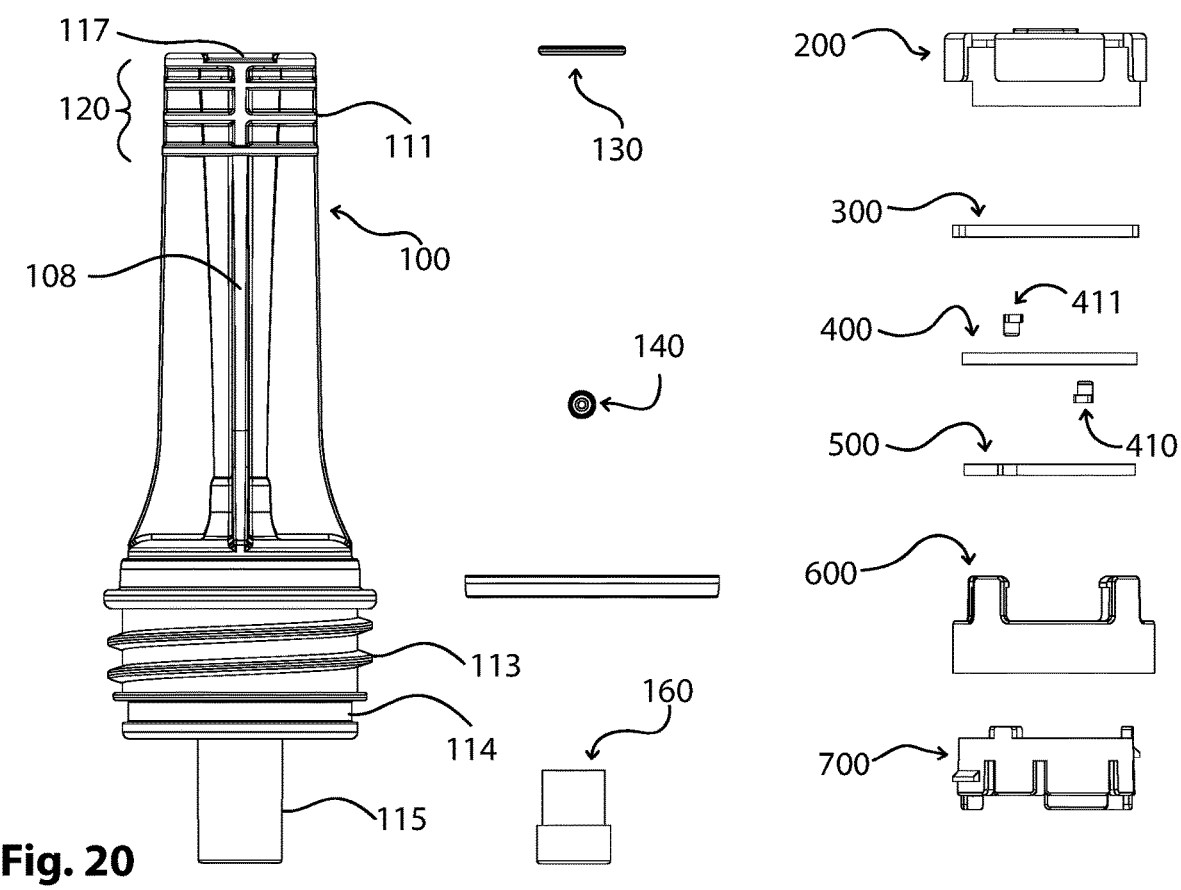
FIG. 20 is an exploded rear view cross section view of the components of FIG. 4.
Figure 21:
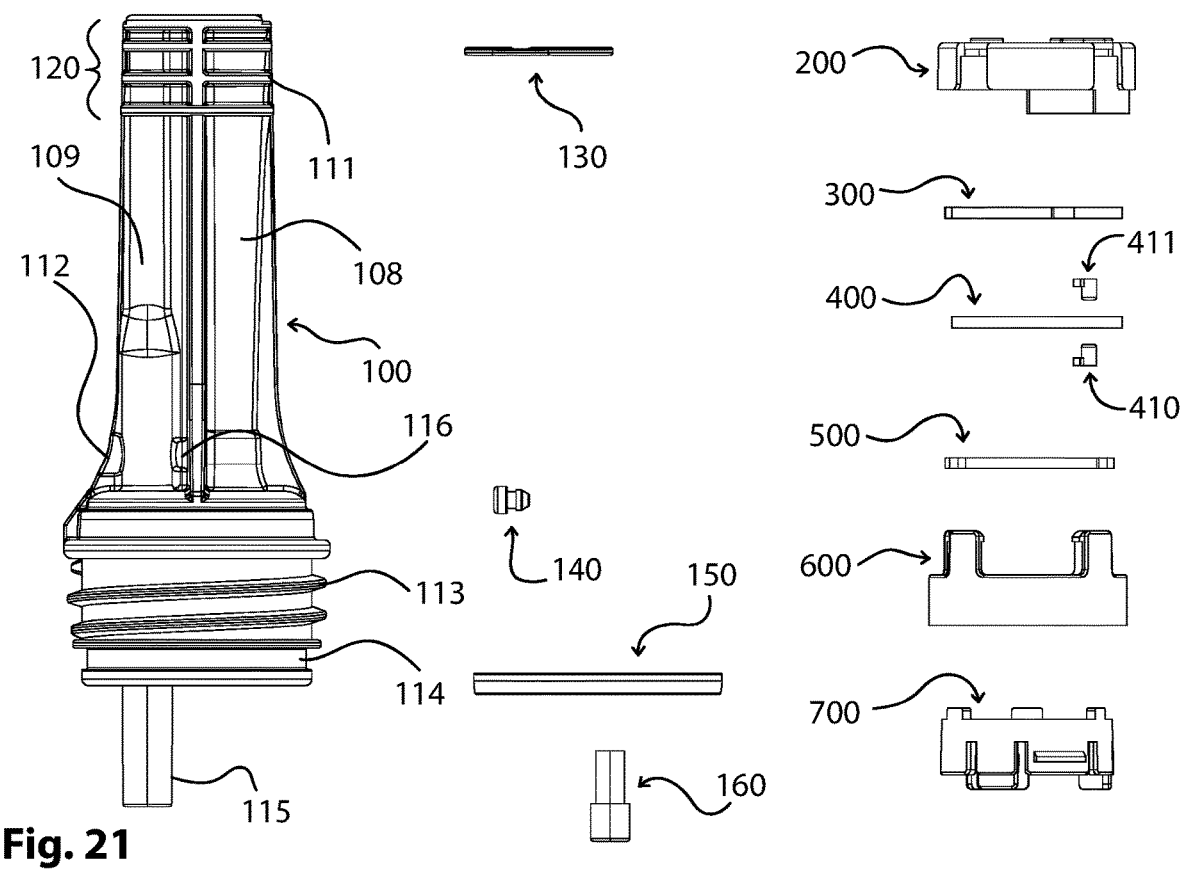
FIG. 21 is an exploded side view cross section view of the components of FIG. 4.
Figure 22:
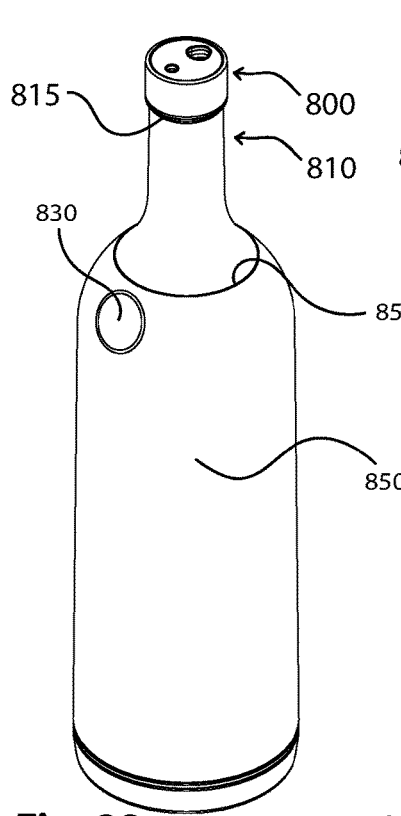
FIG. 22 is a top perspective view of the wine container embodiment of FIG. 4
Figure 23:
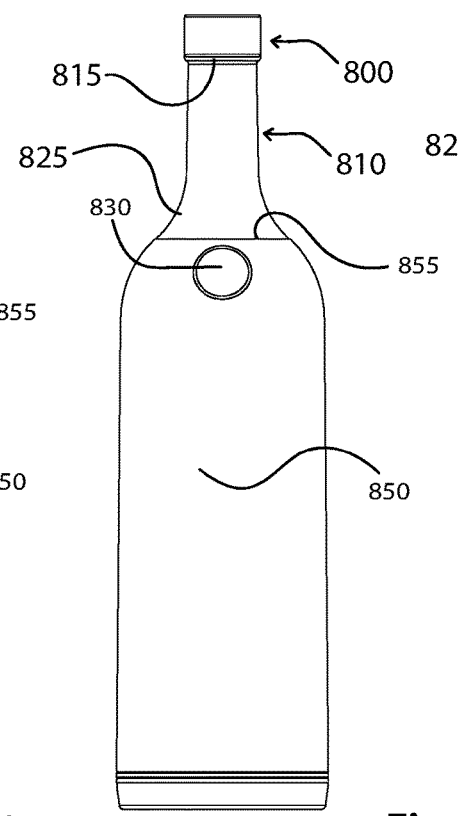
FIG. 23 is front view of the wine container embodiment of FIG. 4
Figure 24:
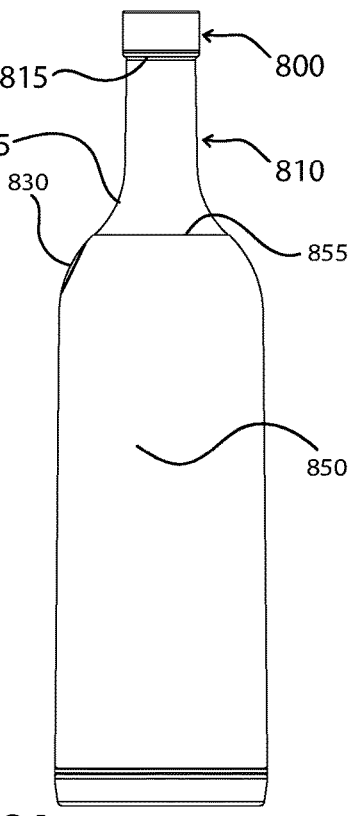
FIG. 24 is a side view of the wine container embodiment of FIG. 4

FIG. 5 is an exploded top perspective view of the top the neck portion of a wine container embodiment of FIG. 1 in an open position relative to landmark 830. FIG. 6 is an exploded top perspective view of the top the neck portion of FIG. 5 where the decorative cap 800 is rotated 180 degrees to a closed position relative to landmark 830. FIGS. 5 and 6 are shown at a side perspective view relative to FIG. 4 in order to illustrate the use of landmark 830 to align the decorative cap 800. Landmark 830 on container 850 designates the desired alignment of the liquid pour outlet 802 when the valve elements are in an "open" position and wine may be poured through the liquid pour outlet. When the decorative cap is rotated 180 degrees, the vent channel 109 is aligned with the landmark to designate that the valve elements are in a "closed" position.

Delayed Valve Actuation

In this example, the closure mechanism includes a compressive structure to provide pressure against sealing elements, and delayed valve actuation mechanism that begins to seal the aerator vent channel and the a liquid pour channel after the decorative cap is turned past 90 degrees from its open position.

The compressive structure includes compressive cap 200 with four locking notches 200a, 200b, 200c, and 200d which is turned with the decorative cap 800, which is retained by a cap holder 600 with four securing tabs 630a, 630b, 630c, and 630d. The compressive cap 200 and the cap holder 600 can partially rotate relative to locking element 700 with four locking tabs 702a, 702b, 702c, and 702d and three notches 703a, 703b, and 703c for anti-rotation and orientation which remains in a fixed position at the top 811 of the decorative neck 810. A silicone seal 130 is positioned between the support plate 500 and the recessed top 117 of aerator 100.

The delayed valve actuation mechanism includes a valve plate 400 which is positioned between an actuation plate 300 with three position tabs 302a, 302b, and 302c and a support plate 500 with three position notches 502a, 502b, 502c. The closure valve is partially rotated when a guide post 410 engages one of the ends of an arced slot 301 on the valve actuator 300.

FIG. 7 shows the orientation of the valve actuator 300 in the open position "A" at 0 degrees rotation; in partial rotations "B" at 45 degrees, "C" at 90 degrees, and "D" at 135 degrees; and at closed position "E" at 180 degrees rotation. FIG. 8 shows the orientation of the valve plate 400 at positions A, B, C, D, and E. FIG. 9 shows the unchanged orientation of support plate 500 at those positions.

The support plate 500 has a liquid opening 508, a vent opening 509, a center hole 507, and an arced slot 501 with a stop closing end 503 and stop opening end 504.

The valve plate 400 has a liquid opening 408, a vent opening 409, a vertically projecting guide pin 410 inserted upward in guide pin hole 402, and a vertically projecting stop guide pin 411 inserted downward in guide pin hole 403.

The actuation plate 300 has a liquid opening 308, a vent opening 309, a center hole 307, an arced slot 301, and three tabs 302a, 302b, and 302c. Arced slot 301 has a closing end 303 and an opening end 304 which are configured to begin engaging a guide pin 410 to open or close the valve plate 400.

FIG. 7 demonstrates how the actuation plate 300 moves from an open position "A", which is collinear to landmark 830, in a clockwise direction toward a closed position "E", which is a half-turn of the actuation plate 300 from its position "A". The actuation plate 300 has a channel 301 to capture a guide post 410 contained in the valve plate 400.

As the actuation plate 300 is rotated clockwise from position "A" at 0 degrees to position "C" at 90 degrees, neither the closing end 303 nor the opening end 304 of arced slot 301 engage the guide pin 410. As the actuation plate 300 is rotated clockwise from position "C" at 90 degrees to position "E" at 180 degrees, the closing end 303 engages the guide pin, thereby causing the valve plate 400 to rotate to fully closed position "E". The shape of the valve plate is designed such that the quarter-turn position will seal the fluid openings of the support plate 500.

As the actuation plate 300 is rotated counterclockwise from position "E" at 180 degrees to position "C" at 90 degrees, neither the closing end 303 nor the opening end 304 of arced slot 301 engage the guide pin 410. As the actuation plate 300 is rotated counterclockwise from position "C" at 90 degrees to position "A" at 0 degrees, the opening end 304 engages the guide pin, thereby causing the valve plate 400 to rotate to fully open position "A".

Stop Feature

In this example, a stop feature is provided to prevent the actuation plate from rotating past a 180 degree Clockwise or past a 0 degree Counterclockwise.

In this example, the support plate has recessed arced channel 501 that captures a stop guide pin 411 extending downward from the valve plate 400. The downward stop guide pin 411 as shown in FIGS. 7-9 projects into a recessed arced channel 501 on the top of the support plate 500 as shown in FIG. 15. The recessed arced channel 501 has a stop closing end 503 and a stop opening end 504.

When the valve plate has rotated clockwise between 0 degrees open and 90 degrees closed, stop guide pin 411 travels in recessed arced channel 501. When the valve plate reaches 90 degrees, the stop closing end 503 of recessed arced channel 501 engages the stop guide pin 411 and prevents further clockwise rotation of the valve plate. When the valve plate clockwise closing rotation is stopped, the engagement of actuator guide pin 410 with the closing end 303 of arced slot 301 also prevents the actuation plate from rotating past 180 degrees-thus maintaining a fully closed alignment of the fluid channels and fluid openings.

When the valve plate has is rotated counterclockwise between 90 degrees closed and 0 degrees open, stop guide pin 411 travels in recessed arced channel 501. When the valve plate reaches 0 degrees, the stop opening end 504 of recessed arced channel 501 engages the stop guide pin 411 and prevents further counterclockwise rotation of the valve plate. When the valve plate counterclockwise closing rotation is stopped, the engagement of guide post 410 with the opening end 304 of arced slot 301 also prevents the actuation plate from rotating past 0 degrees—thus achieving a fully open alignment of the fluid channels and fluid openings.

Other Examples of Closure Configurations

This mechanism described in the example above permits the decorative cap 800 and the actuation plate 300 to rotate 180 degrees while only rotating the valve plate 90 degrees. In thE example above, it is desirable to use landmark 830 to align the decorative cap fluid opening 808 to designate when the fluid channels 108 and 109 are fully open so that wine may be poured out fluid opening 808 while fluid opening 809 permits venting; and to use landmark 830 to align the decorative cap vent opening 809 to designate when the fluid channels 108 and 109 are fully closed.

In other examples, a closure mechanism may comprise a compressive structure to provide pressure against sealing elements of delayed valve actuation mechanism that opens and closes two or more channels with different rotations of a valve plate relative to an actuation plate.

In another example, for instance, a single body device that houses two containers, each holding different liquids, such as olive oil and balsamic vinegar commonly used for salad dressing, can be poured and regulated by a single closure mechanism.

In another example, it is desirable to provide a single body device that houses multiple containers, each holding container holding different liquids, such as a primary alcohol spirit, for example first flavoring liquid, and a second flavoring liquid, that can be managed by a single closure mechanism to allow a controlled ratio of those liquids to be combined as part of the pouring process.

It is to be understood that the specific embodiments and examples described above are by way of illustration, and not limitation. Various modifications may be made by one of ordinary skill, and the scope of the invention is as defined in the appended claims.

What is claimed is:

1. A closure mechanism for a container having two fluid channels, the closure mechanism comprising a cap
    a delayed valve actuation mechanism comprising
        an actuation plate configured to rotate about a central axis in a first direction in a range of 0 to 180 degrees, and to rotate about the central axis in a direction opposite the first direction in a range of 180 degrees to 0 degrees, the actuation plate comprising
            a bottom surface,
            an arced slot comprising an opening end and a closing end,
            a first fluid opening and a second fluid opening,
        a support plate comprising
            a top surface,
            a first fluid opening, a second fluid opening, an arced slot comprising an opening end and a closing end,
        a valve plate configured to rotate about the central axis as the cap is moved in the first direction range of 0 to 90 degrees, and rotate about the central axis in a direction opposite the first direction as the cap is moved in a range of 90 degrees to 0 degrees, the valve plate comprising
            a first fluid opening and a second fluid opening,
            a top surface configured to seal against the bottom surface of the actuation plate,
            a bottom surface configured to seal against the top surface of the support plate,
        a first actuation post extending upward into the actuation plate arced slot,
            the first actuation post forcing the valve plate to rotate in concert with the actuation plate when the first actuation post is in contact with the opening end or the closing end of the arced slot of the actuation plate, and
        a second actuation post extending downward into the support plate arced slot, the second actuation post forcing the valve plate to rotate in concert with the second actuation plate when the actuation post is in contact with the opening end or the closing end of the arced slot in the support plate; and
        a compressive structure configured to maintain a compressive force between the bottom surface of the actuation plate and the top surface of the valve plate, and between the bottom surface of the valve plate and the top surface of the support plate, such that
            (a) when the valve plate and the valve actuation plate are oriented at 0 degrees, a first fluid path is formed between a first container fluid channel through the first fluid openings of the support plate, valve plate and actuation plate, and a second fluid path is formed between a second container fluid channel through the second fluid openings of the support plate, valve plate and actuation plate, and
            (b) when the valve plate is oriented at 90 degrees, the portions of the valve plate seal the first and second fluid openings of the support plate.

2. A wine container comprising
a housing comprising a main body with an insulated chamber;
a removable neck assembly, the removable neck assembly being attachable to the main body, and comprising
    an aerator having a first liquid channel and a second air channel, and
    a closure mechanism comprising
        a delayed valve actuation mechanism comprising
            an actuation plate configured to rotate about a central axis in a first direction in a range of 0 to 180 degrees, and to rotate about the central axis in a direction opposite the first direction in a range of 180 degrees to 0 degrees, the actuation plate comprising
                a bottom surface,
                an arced slot comprising an opening end and a closing end,
                a first fluid opening and a second fluid opening,
            a support plate comprising
                a top surface,
                a first fluid opening, a second fluid opening, an arced slot comprising an opening end and a closing end,
            a valve plate configured to rotate about the central axis in the first direction range of 0 to 90 degrees, and rotate about the central axis in a direction opposite the first direction in a range of 90 degrees to 0 degrees, the valve plate comprising
a first fluid opening and a second fluid opening,
a top surface configured to seal against the bottom surface of the actuation plate,
a bottom surface configured to seal against the top surface of the support plate,
a first actuation post extending upward into the actuation plate arced slot, the first actuation post forcing the valve plate to rotate in concert with the actuation plate when the first actuation post is in contact with the opening end or the closing end of the arced slot of the actuation plate, and
a second actuation post extending downward into the support plate arced slot, the second actuation post forcing the valve plate to rotate in concert with the actuation plate when the second actuation post is in contact with the opening end or the closing end of the arced slot in the support plate, and
a compressive structure configured to maintain a compressive force between the bottom surface of the actuation plate and the top surface of the valve plate, and between the bottom surface of the valve plate and the top surface of the support plate, such that
(a) when the valve plate and the valve actuation plate are oriented at 0 degrees, a first fluid path is formed between a first container fluid channel through the first fluid openings of the support plate, valve plate and actuation plate, and a second fluid path is formed between a second container fluid channel through the second fluid openings of the support plate, valve plate and actuation plate, and
(b) when the valve plate is oriented at 90 degrees, the portions of the valve plate seal the first and second fluid openings of the support plate.

3. The wine container of claim 2 further comprising a decorative cap, the decorative cap comprising
a liquid opening, and
a vent opening.

4. The wine container of claim 2 further comprising
a landmark provided on the wine container housing, such that when the removable neck assembly is attached to the main body, the landmark designates
the desired orientation of the liquid opening for the decorative cap to be in an open orientation, and
the desired orientation of the vent opening for the decorative cap to be in a closed orientation.

5. A method for opening and closing a container, the method comprising
providing a liquid container comprising
an insulated liquid storage chamber within a main body housing, and neck assembly, the neck assembly being removably attached to the main body, and comprising
an aerator with a liquid channel and a vent channel,
a cap comprising
a center point and a central axis of rotation,
a liquid channel opening, and
a vent opening, such that the liquid channel opening, center point, and vent opening are aligned, the cap having
an open orientation where the liquid channel opening is aligned with the aerator liquid channel, and the vent opening is aligned with the aerator vent channel, and
a closed orientation where the liquid channel opening is aligned with the aerator vent channel, the vent opening is aligned with the aerator liquid channel, and the aerator liquid channel and aerator vent channel are both sealed by the valve plate,
the cap configured to partially rotate 0 to 180 degrees clockwise, and 180 degrees to 0 degrees counterclockwise, and
a delayed valve actuation mechanism comprising
an actuation plate configured to rotate about a central axis in a first direction in a range of 0 to 180 degrees, and to rotate about the central axis in a direction opposite the first direction in a range of 180 degrees to 0 degrees, the actuation plate comprising
a bottom surface,
an arced slot comprising an opening end and a closing end,
a first fluid opening and a second fluid opening,
a support plate comprising
a top surface,
a first fluid opening, a second fluid opening, an arced slot comprising an opening end and a closing end,
a valve plate configured to rotate about the central axis as the cap is moved in the first direction range of 0 to 90 degrees, and rotate about the central axis in a direction opposite the first direction as the cap is moved in a range of 90 degrees to 0 degrees, the valve plate comprising
a first fluid opening and a second fluid opening,
a top surface configured to seal against the bottom surface of the actuation plate,
a bottom surface configured to seal against the top surface of the support plate,
a first actuation post extending upward into the actuation plate arced slot, the first actuation post forcing the valve plate to rotate in concert with the actuation plate when the first actuation post is in contact with the opening end or the closing end of the arced slot of the actuation plate, and
a second actuation post extending downward into the support plate arced slot, the second actuation post forcing the valve plate to rotate in concert with the actuation plate when the second actuation post is in contact with the opening end or the closing end of the arced slot in the support plate, and
a compressive structure configured to maintain a compressive force between the bottom surface of the actuation plate and the top surface of the valve plate, and between the bottom surface of the valve plate and the top surface of the support plate, such that
(a) when the valve plate and the valve actuation plate are oriented at 0 degrees, a first fluid path is formed between a first container fluid channel through the first fluid openings of the support plate, valve plate and actuation plate, and a second fluid path is formed between a second container fluid channel through the second fluid openings of the support plate, valve plate and actuation plate, and (b) when the valve plate is oriented at 90 degrees, the portions of the valve plate seal the first and second fluid openings of the support plate;

moving the cap between a closed orientation and an open orientation, thus rotating the valve plate between a closed orientation and an open orientation, and moving the cap between an open orientation and a closed orientation, thus rotating the valve plate between an open orientation and a closed orientation.

\* \* \* \* \*